United States Patent [19]

McKann

[11] Patent Number: 5,601,257
[45] Date of Patent: Feb. 11, 1997

[54] AIR VEHICLE YAW CONTROL SYSTEM

[75] Inventor: H. Smith McKann, Fredericksburg, Va.

[73] Assignee: Benchmark Corporation, Fredericksburg, Va.

[21] Appl. No.: 288,916

[22] Filed: Aug. 11, 1994

[51] Int. Cl.⁶ .................................................. B64C 27/52
[52] U.S. Cl. ............................... 244/17.25; 244/17.19; 416/169 R; 416/128; 416/130
[58] Field of Search .................... 244/17.11, 17.19, 244/17.25; 416/142, 148, 149, 155, 159, 169 R, 120, 124, 128–130

[56] References Cited

U.S. PATENT DOCUMENTS

| | | | |
|---|---|---|---|
| 2,037,745 | 4/1936 | Vaughn | 416/129 |
| 2,192,300 | 3/1940 | Droitcour | 244/17.23 |
| 2,422,441 | 6/1947 | Sights | 416/129 |
| 2,589,030 | 3/1952 | Alde | 244/17.25 |
| 3,002,711 | 10/1961 | Stefano | 244/17.23 |
| 3,126,966 | 3/1964 | Agamian | 244/17.19 |
| 3,149,802 | 9/1964 | Wigal | 244/17.11 |
| 3,506,219 | 4/1970 | Moville et al. | 244/17.21 |
| 3,554,467 | 1/1971 | Yowell | 244/17.19 |
| 3,563,496 | 2/1971 | Zuck | 244/17.19 |
| 3,669,564 | 6/1972 | Garfinckle | 244/17.19 |
| 3,735,945 | 5/1973 | Huvers | 244/17.19 |
| 3,771,923 | 11/1973 | De Montaigu et al. | 416/143 |
| 3,921,939 | 11/1975 | Garfinkle | 244/17.25 |
| 4,301,981 | 11/1981 | Hartt | 244/17.11 |
| 4,702,437 | 10/1987 | Stearns, Jr. | 244/17.11 |
| 4,726,547 | 2/1988 | Zimmer | 244/17.19 |
| 4,875,643 | 10/1989 | Gietzen et al. | 244/17.11 |
| 4,913,376 | 4/1990 | Black | 244/17.11 |
| 5,042,747 | 8/1991 | Rabouyt | 244/17.19 |
| 5,058,825 | 10/1991 | Rabouyt | 244/17.25 |

*Primary Examiner*—Galen I. Barefoot
*Attorney, Agent, or Firm*—Roylance, Abrams, Berdo & Goodman, L.L.P.

[57] ABSTRACT

The yaw control in an air vehicle having counter rotating rotors is provided by selectively and controllably applying a frictional drag or braking force to drive gears for the two rotors. Each of the drive gears includes a friction surface. Friction pads are located adjacent to and are releasably engagable with the friction surfaces of the drive gears. The friction pads are supported by a control mechanism for selectively moving each of the friction pads into engagement with the respective drive gear to provide a frictional drag on the drive gear and to a disengaged position spaced from the respective drive gear. The frictional forces created by engagement of the friction pads with the drive gear friction surfaces cause net torques on the air vehicle frame to rotate the air vehicle in the desired directions. Normally, the torque developed the counter rotating rotors is canceled, maintaining the air vehicle in the desired yaw orientation.

19 Claims, 3 Drawing Sheets

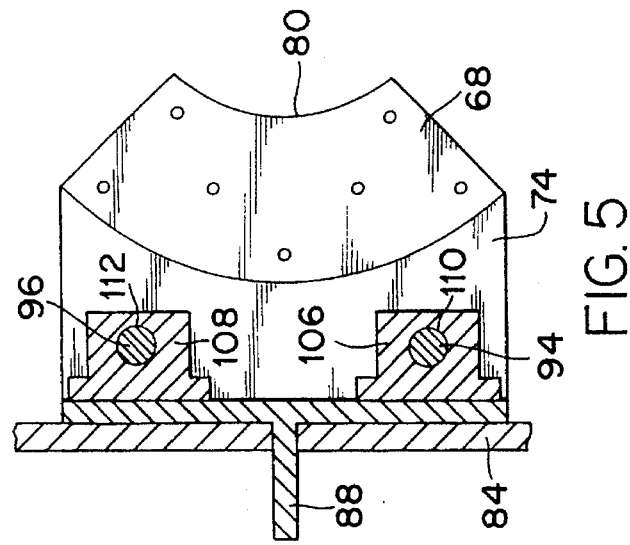
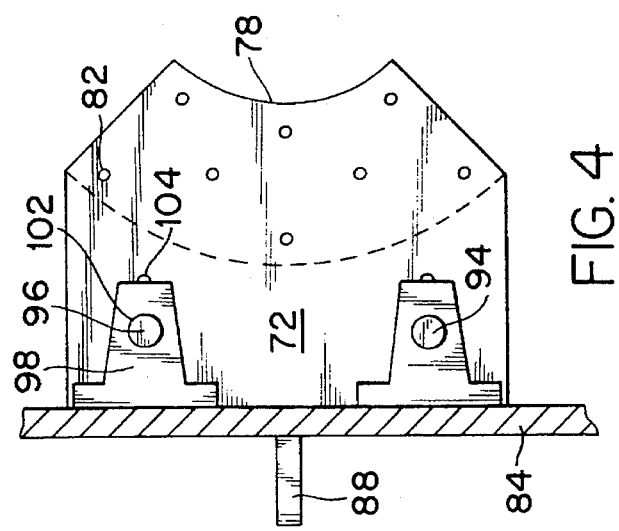
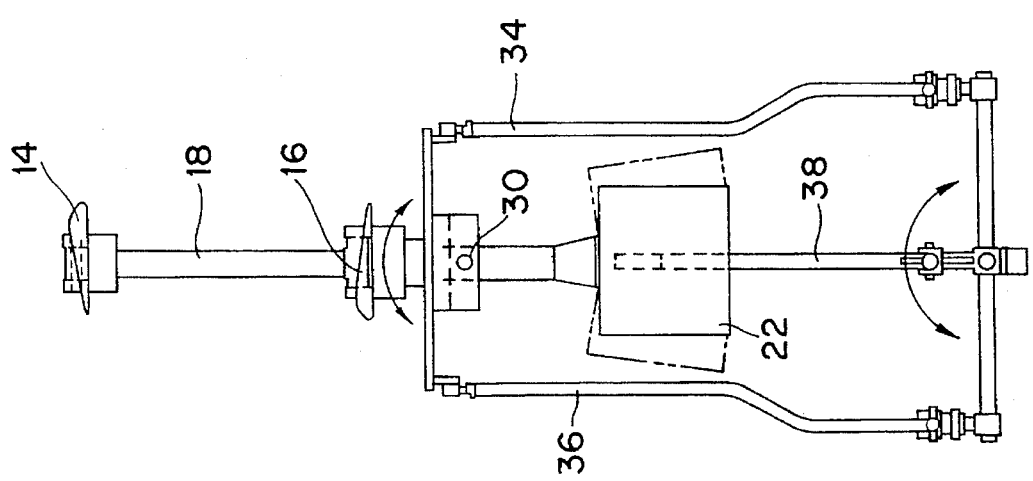

AIR VEHICLE YAW CONTROL SYSTEM

FIELD OF THE INVENTION

The present invention relates to a yaw control system for an air vehicle with contrarotating rotors. More particularly, the present invention involves using friction pads which selectively and releaseably engage friction surfaces on a gear of the drive gear mechanism for each of the contrarotating rotors for controlling the yaw of the air vehicle.

BACKGROUND OF THE INVENTION

In an air vehicle or aircraft with two coaxially mounted contrarotating or counter rotating rotors, the rotors provide both the lift controlling vertical movement and horizontal velocity. Horizontal flight is achieved by tilting rotors forward at a certain angle. The direction flight or yaw attitude can be controlled in a number of different ways.

With coaxial counter rotating rotors, power is normally evenly distributed between the rotors. The equal distribution of the power causes the torque from each rotor to be canceled by the other rotor such that no net torque reaction is passed to the vehicle body. With the torque balanced, the air vehicle will remain in the desired direction. To change the direction of the air vehicle a propeller can be vertically mounted on a tail or other horizontal extension of the air vehicle. Yaw control can then be provided by controlling this propeller, for example, by the angle of the blades of that vertical propeller.

With the two counter rotating rotors, yaw control can also be obtained by unbalancing the power distribution between the rotors, for example, by varying the pitch of the blades of one rotor relative to the blades of the other rotor. However, this yaw control system requires expensive and complicated mechanical mechanisms and is difficult to operate.

Other yaw control systems for air vehicles with contrarotating rotors include a yaw control motor which applies a variable torque to the gears of the rotor transmission, as disclosed in U.S. Pat. No. 3,669,564 to Garfinkle. Another arrangement providing yaw control through the drive gear mechanism for the counter rotating rotors is disclosed in U.S. Pat. No. 3,735,945 to Huvers, which discloses the use of a variable clutch located between idler gears of the drive trains of the two rotors. The Huvers clutch provides varying torques to the idler gears, and thereby controls the resulting torque applied to the air vehicle body to turn the air vehicle in either direction for yaw control. These two systems for providing yaw control through the differential gear reduction mechanism are difficult and costly to manufacture and operate.

An external yaw control system is disclosed in U.S. Pat. No. 3,554,467 to Yowell which provides exteriorly mounted vertical stabilizers which are pivoted to the air frame within the down draft of the counter rotating rotors. Yaw control is provided by controlling the pivoted angle of the vertical stabilizers. However, these external vertical stabilizers, like the external vertical propeller, further complicate and increase the size of the air vehicle.

SUMMARY OF THE INVENTION

An object of the present invention is to provide an air vehicle yaw control system for an air vehicle having two contrarotating rotors which is easy and inexpensive to manufacture and maintain, and is simple to operate.

Another object of the present invention is to provide an air vehicle yaw control system which does not necessitate additional exterior parts on the air vehicle, but can be easily and simply mounted within the air frame structure.

A further object of the present invention is to provide an air vehicle yaw control system which can be easily mounted on and adapted to existing structure on conventional air vehicle designs with two contrarotating rotors.

The foregoing objects are basically obtained by a yaw control system for an air vehicle having a pair of coaxially mounted contrarotating or counter rotating rotors. The system comprises first and second drive means for rotating first and second rotors, respectively, in opposite rotational directions. Each of the drive means includes a rotatable drive gear with a friction surface. First and second friction pads are located adjacent to and are releasably engagable with the friction surfaces of the drive gears. Control means support the friction pads for selectively moving the friction pads between a first position in which one friction pad engages and applies a friction drag force on the respective drive gear and a second position in which the friction pads are disengaged and spaced from the respective drive gears.

By forming the yaw control system in this manner, movement of the first friction pad into engagement with the friction surface of the first gear causes the air vehicle to rotate in one direction, while engagement of the second friction pad with the friction surface of the second gear causes the air vehicle to rotate in the opposite direction. When both friction pads are disengaged from the respective drive gear friction surfaces, the rotor torque on the air vehicle is counter balanced, thereby maintaining the air vehicle in the set direction. Thus, by merely controlling the engagement of the friction pads with the friction surfaces on the gears, the yaw of the air vehicle can be easily controlled by a relatively simple mechanical mechanism.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 2 is a partial front elevational view of the air vehicle graphically illustrated in FIG. 1;

FIG. 4 is a partial, top plan view of the air vehicle taken along lines 4—4 of FIG. 3; and FIG. 5 is a partial, top plan view of the air vehicle in section taken along lines 5—5 of FIG. 3.

DETAILED DESCRIPTION OF THE INVENTION

Figure 1:
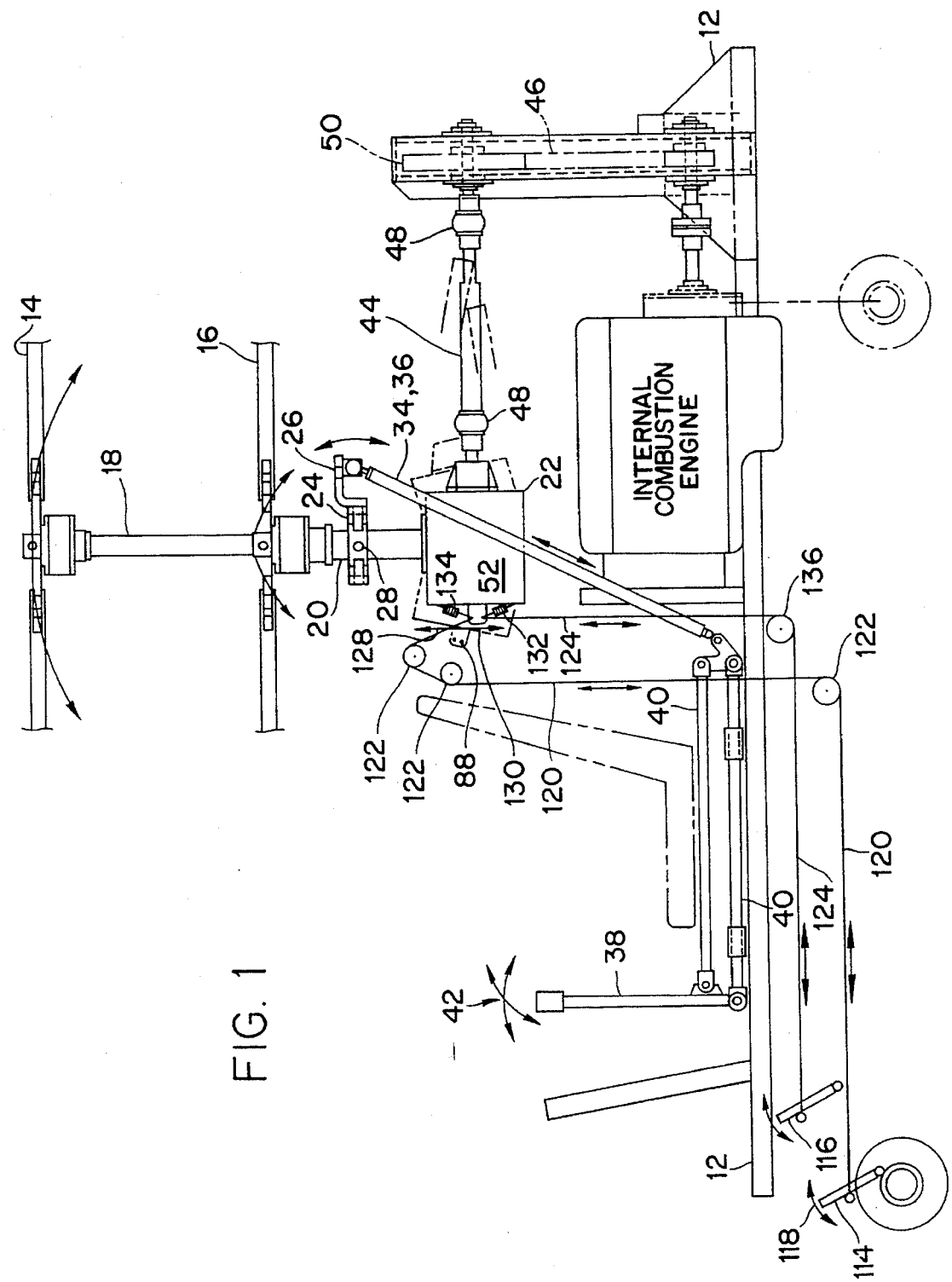
FIG. 1 is a side elevational view partially and graphically illustrating an air vehicle having a yaw control system in accordance with the present invention.

Referring initially to FIGS. 1 and 2, the air vehicle 10 of the present invention comprises an air frame 12. The air frame is only graphically illustrated in FIG. 1, and forms the body of the air vehicle. The air vehicle is propelled by first and second counter rotating or contrarotating rotors 14 and 16. The rotors are mounted for rotation in opposite directions and can tilt at an angle of up to approximately 15 degrees from the vertical orientation of the axis of rotor rotation. With the rotation of the rotors in a horizontal plane, the axis of rotation is vertical.

Rotor 14 is coupled to drive shaft 18, while rotor 16 is coupled to drive shaft 20 for respective simultaneous rotation. The two drive shafts are coaxial and are maintained in a coaxial relationship relative to each other, even when the rotors are tilted.

Drive shafts 18 and 20 are coupled to a differential gear reduction mechanism 22. Each drive shaft extends from and is rotatably driven by the gear reduction mechanism, with drive shaft 18 extending coaxially through hollow drive shaft 20.

A rotor tilting or gimbaled mechanism 24 supports both drive shafts for tilting about tilt axes 28 and 30. The tilt mechanism includes a support member which is coupled to drive shaft 20, and thereby to drive shaft 18 through gear reduction mechanism 22. Support member 26 is pivotally coupled to tilt links 34 and 36. Tilt links 34 and 36 are connected to directional control level or stick 38 through linkage 40. By tilting lever 38 in the desired direction of travel, the propellers will be tilted in that direction to propel the air vehicle in that direction. The tilting of the control lever is graphically illustrated by arrows 42.

Power is supplied to differential gear reduction mechanism 22 by an internal combustion engine (not shown). The output of the internal combustion engine is coupled to power shaft 44 through a drive belt 46. Power shaft 44 has universal joints 48 to compensate for movement of the gear reduction mechanism 22 when the rotors are tilted. The drive belt is coupled to the power shaft by a conventional pulley or gear 50.

The blades of each rotor are coupled to the respective drive shaft in a conventional manner to provide a hinge for flexing of the rotors in a direction transverse to their length and to permit pivoted adjustment about their longitudinal axis. Such mounting of the rotor blades is conventional, and thus, is not described in detail.

Figure 3:
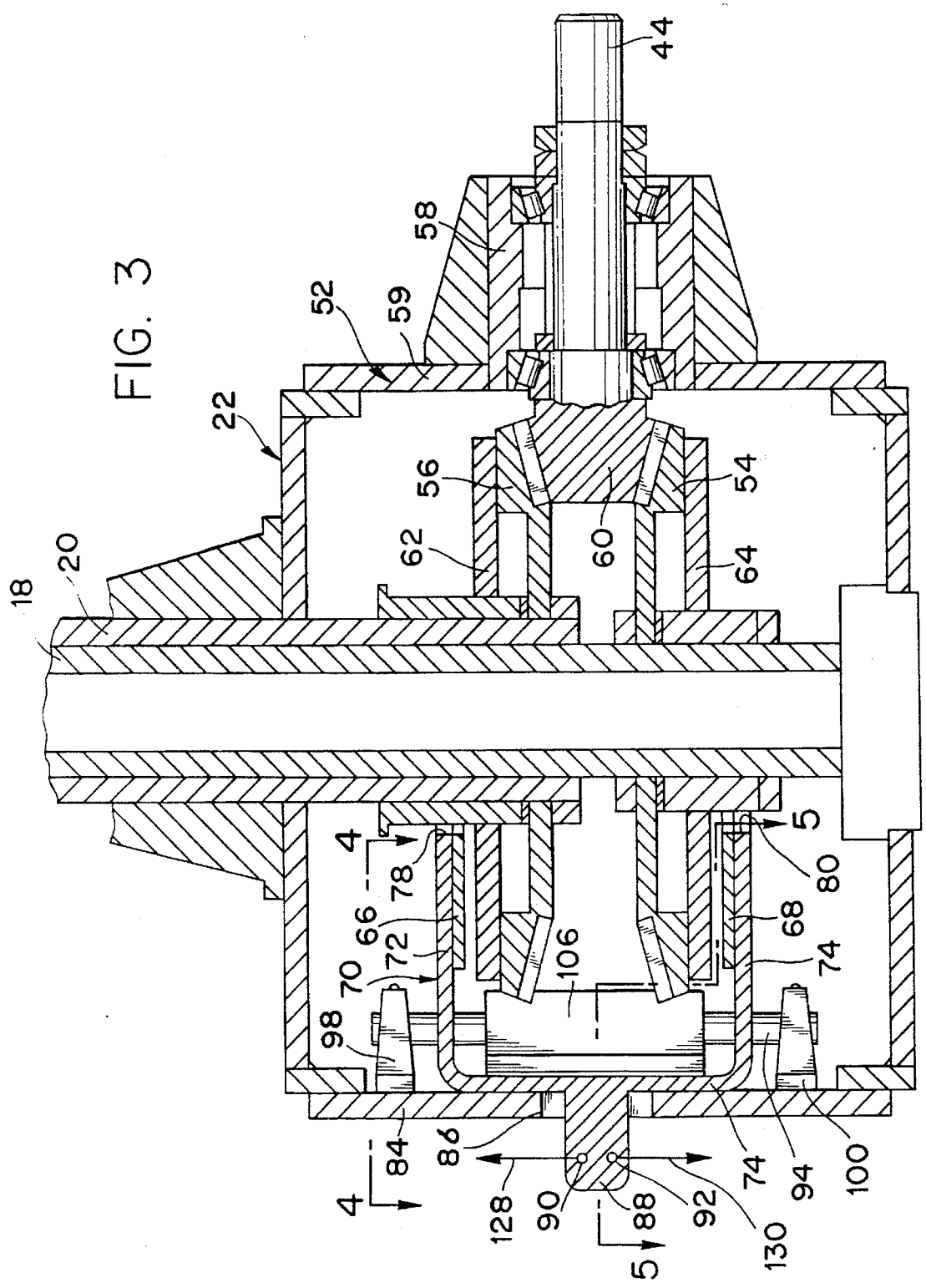
FIG. 3 is a partial, enlarged, side elevational view in section of the differential gear drive reduction mechanism of the air vehicle of FIG. 1.

Yaw control, according to the present invention, is provided within gear housing 52 of the gear reduction mechanism, as illustrated in FIGS. 3–5. This yaw control operates on the drive gears of the drive shafts by applying a frictional force or braking force on drive gears for the rotors, producing a resulting torque on the air frame to rotate the air frame.

In accordance to conventional practices, drive shaft 18 is fixedly coupled to annular drive gear 54. Drive shaft 20 is similarly fixedly coupled to annular drive gear 56. Drive gears 54 and 56 are located adjacent to and coaxial to each other, but are spaced axially along the longitudinal rotational axis of drive shafts 18 and 20.

Power shaft 44 is mounted in a bearing 58 which is supported in a wall 59 of gear housing 52. A portion of the power shaft extends within gear housing 52 and terminates in a bevel gear 60. Bevel gear 60 is located in the axial space between drive gears 54 and 56, and has teeth which mate with corresponding gear teeth on the drive gears. Rotation of power shaft 44 about its longitudinal or horizontal axis, as viewed in FIG. 3, causes the two drive gears to rotate about a vertical axis, as illustrated in FIG. 3, with drive gear 56 rotating in a rotational direction opposite to the rotational direction of drive gear 54. With annular drive gear 54 secured to drive shaft 18 and annular drive gear 56 secured to drive shaft 20, the drive shafts will also rotate in opposite directions about the same vertical axis, thereby rotating the rotors in opposite directions.

With the drive gears and rotors rotating at equal and opposite rotational speeds, the torque on the air vehicle frame produced by rotation of each drive gear and rotor will be equal and opposite, such that the torques cancel each other out. Thus, a zero net torque is applied to the air vehicle frame by the gears and rotors. According to the present invention, by applying a frictional or braking force to one of the two drive gears, a net torque will be produced on the air vehicle frame in one rotational direction or the other rotational direction, depending upon which drive gear is engaged with a frictional force. This net torque will turn the air vehicle, and thus, provide yaw control.

To facilitate the application of frictional forces, friction plate 62 is mounted on the upper surface of drive gear 56 and friction plate 64 is mounted on the lower surface of drive gear 52 to provide friction surfaces on the drive gears. The friction plates are generally annular, extend around the drive shafts, and are fixed to the respective drive gear for simultaneous rotation therewith. The frictional drag force is applied to the friction plates by friction pads 66 and 68.

Friction pads 66 and 68 are generally arcuate and are oriented along an arc corresponding to the curvature of the annular drive gears 54 and 56. The movement of the pads is controlled and limited to an axis, which is substantially parallel to and laterally offset from the rotational axis of the drive gears, in directions toward and away from the friction plates. Friction pad 68 is located adjacent to and facing friction plate 64. Friction pad 66 is located adjacent to and facing friction plate 62.

The friction pads are mounted for controlled movement within gear housing 52 by a control mechanism including a U-shaped support bracket 70. Support bracket 70 comprises two horizontal flanges 72 and 74 integrally connected by a back member 76. The back member extends generally vertically in the gear housing, while the flanges extend substantially perpendicularly from the back member and are generally horizontal within the gear housing. The distal ends of the flanges have arcuate recesses 78 and 80. The friction pads are coupled to the bracket flanges by suitable fasteners 82 or other conventional securing means. The flanges extend at a distance above friction plate 62 and below friction plate 64. The friction pads are secured to the inner surfaces of the flanges such that each pad is positioned between one of the flanges and one of the friction plates.

In the normal or intermediate position of the bracket, each of the friction pads is spaced from the respective friction plate. In this normal position, neither friction pad applies a frictional force to a drive gear. When the bracket moves downwardly, friction pad 66 engages friction plate 62 to provide a drag or braking force on drive gear 56. Such drag force will produce a net torque on the air vehicle frame causing the air vehicle to rotate in one direction until the friction pad is moved back to its normal spaced position. If the bracket is moved upwardly, friction pad 68 engages friction plate 64 to provide a drag force on drive gear 54 producing a net torque on the air vehicle frame to rotate the vehicle in the opposite direction.

Back member 74 lies adjacent a wall 84 of gear housing 52 opposite gear housing wall 59. Wall 84 has an opening 86 extending completely through the wall. Back member 74 overlies the opening, and has a horizontally extending projection 88. Projection 88 is formed as an integral part of the support bracket and extends through opening 86 to expose a portion of the projection exteriorly of gear housing 52. The exterior portion of the projection comprises two vertically spaced openings 90 and 92 to facilitate connection of a control linkage to the support bracket.

Support bracket 70 is mounted in the gear housing for controlled vertical axial movement by two vertically extending guide rods 94 and 96. Each guide rod is mounted on the inner surface of gear housing wall 84 by upper and lower support blocks which are fixed to and extend perpendicularly from the inner surface of gear housing wall 84. Each block has a through bore 102 that slidably receives a respective end of one of the guide rods. Each block is provided with a set screw 104 extending perpendicular to bore 102 to engage and retain the guide rod in position in the bore hole.

Guide rods 94 and 96 are coupled to bracket 70 by guide members 106 and 108. The guide members are suitably secured to the inner surface of back member 74 between flanges 72 and 74. The guide members have through bores 110 and 112, respectively. Bore 110 receives guide rod 94, while bore 112 receives guide rod 96. Suitable openings are provided in flanges 72 and 74 which are coaxial with bores 110 and 112 to permit the guide rods to pass through the bracket flanges. Support blocks 98 and 100, guide rods 94 and 96 and guide members 106 and 108 guide the bracket along a precise axial path such that the bracket flanges and friction pads 66 and 68 remain parallel to friction plates 62 and 64 during both movement and engagement, regardless of any tilting of the rotors. This controlled movement also controls the frictional force applied to drive gears 54 and 56.

The air vehicle operator controls movement of control bracket 70 through a control linkage with control members located within the cockpit. These control members can comprise foot pedals 114 and 116 pivotally mounted in the cockpit. The movement of pedal 114 is graphically illustrated by arrow 118. Foot pedal 114 is coupled to support bracket projection 88 by a control cable 120. Control cable 120 passes around pulleys 122 to locate the end of the cable remote from pedal 114 in a vertical direction extending upwardly from projection opening 90. Foot pedal 116 is coupled by control cable 124 to support bracket projection 88. Control cable 124 passes around pulley 126 to locate the end of cable 124 remote from foot pedal 116 in a vertical direction extending downwardly from projection opening 92. In this manner, depressing pedal 114 moves support bracket 70 in an upward direction as indicated by arrow 128. Depressing foot pedal 116 moves support bracket 70 in a downward direction as indicated by arrow 130.

The support bracket is biased toward the intermediate or normal position illustrated in FIG. 3 by two tension springs 132 and 134, as illustrated in FIG. 1. One end of each spring is secured to gear housing 52. The opposite end of each spring is secured to bracket projection 88. The equal and opposite biasing forces applied to the bracket by springs 132 and 134 normally locate the support bracket in the illustrated intermediate position of FIG. 3. When the operator of the air vehicle releases both foot pedals 114 and 116, the biasing force of springs 132 and 134 will return the support bracket to or maintain the support bracket in the position in which friction pads 66 and 68 are spaced from friction plates 62 and 64.

During flight, the operator will control the air vehicle yaw by selectively depressing and releasing foot pedals 114 and 116. To turn the air vehicle in one direction, pedal 114 is depressed to move the bracket upwardly causing friction pad 68 to engage the planar friction surface of friction plate 64. Similarly, to rotate the air vehicle in the opposite direction, foot pedal 116 is depressed to move the bracket downwardly causing friction pad 66 to engage the planar friction surface on friction plate 62.

While a particular embodiment has been chosen to illustrate the invention, it will be understood by those skilled in the art that various changes and modifications can be made therein without departing from the scope of the invention as defined in the appended claims.

What is claimed is:

1. A yaw control system for an air vehicle having a pair of coaxially mounted contrarotating rotors, comprising:

a first drive means for rotating a first rotor in a first rotational direction, said first drive means including a first rotatable drive gear with a first friction surface, said first friction surface being substantially planar;

a second drive means for rotating a second rotor in a second rotational direction opposite to the first rotational direction, said second drive means including a second rotatable drive gear with a second friction surface, said second friction surface being substantially planar;

first and second friction pads located adjacent to and releasably engagable with said friction surfaces of said first and second drive gears, respectively, for applying a frictional drag force on said drive gears and said drive means in opposition to rotation thereof to rotate the rotors; and control means, supporting said friction pads, for selectively moving each of said friction pads between a first position engaging and applying the frictional drag force on the respective drive gear to produce a turning torque on the air vehicle and a second position disengaged and spaced from the respective drive gear for said drive means to rotate the rotors without the frictional drag force.

2. A yaw control system according to claim 1 wherein said first and second drive gears are horizontally mounted for rotation about a common vertical axis.

3. A yaw control system according to claim 2 wherein said control means comprises a support bracket including first and second parallel flanges extending from a common back member; and said first and second friction pads are coupled to said first and second flanges, respectively.

4. A yaw control system according to claim 3 wherein said first and second flanges and said first and second friction pads overlie said friction surfaces.

5. A yaw control system according to claim 4 wherein said first and second friction surfaces face in opposite axial directions of said first and second drive gears.

6. A yaw control system according to claim 3 wherein said back member of said support bracket is coupled to control linkage means for moving said support bracket to position said friction pads selectively in said first and second positions.

7. A yaw control system according to claim 6 wherein said control linkage means comprises a pair of pivoted levers coupled to said back member by a pair of control cables.

8. A yaw control system according to claim 3 wherein said support bracket is movably mounted in a gear housing enclosing said first and second drive gears; and biasing means is coupled to said support bracket for biasing said support bracket to a normal position in which said first and second friction pads are located in said second positions thereof.

9. A yaw control system according to claim 8 wherein said biasing means comprises springs coupled to said gear housing and said support bracket.

10. A yaw control system according to claim 1 wherein said first and second drive gears are fixedly coupled for simultaneous rotation to first and second rotor drive shafts, respectively, independently of said friction pads;

angular control means is coupled to said drive shafts for tilting said drive shafts relative to a vertical axis.

11. A yaw control system according to claim 1 wherein said first and second drive gears are located inside a gear housing; and said control means comprises a support bracket movably mounted in said gear housing between an intermediate position with each of said first and second friction pads in said second positions thereof, a lower position with said first friction pad in said first position thereof and said second friction pad in said second position thereof, and an upper position with said first friction pad in said second position thereof and said second friction pad in said first position thereof.

12. A yaw control system according to claim 11 wherein said gear housing comprises a vertically extending guide rod; and said support bracket comprises a vertically extending guide member slidably receiving said guide rod.

13. A yaw control system according to claim 1 wherein a power gear, extending between said first and second drive gears, is coupled to said first and second drive gears on facing sides thereof; and said friction surfaces are located on sides of said first and second drive gears opposite said power gear.

14. An air vehicle, comprising:

first and second coaxially mounted, contrarotating rotors;

a first drive means for rotating said first rotor in a first rotational direction, said first drive means including a first rotatable drive gear with a first friction surface;

a second drive means for rotating second rotor in a second rotational direction opposite to the first rotational direction, said second drive means including a second rotatable drive gear with a second friction surface;

a gear housing in which said first and second drive gears are located;

first and second friction pads located adjacent to and releasably engagable with said friction surfaces of said first and second drive gears, respectively, for applying frictional drag forces on said drive gears and said drive means in opposition to rotation thereof to rotate said rotors, said first and second drive means rotating said rotors independently of engagement of said friction pads with said friction surfaces; and yaw control means, supporting said friction pads, for selectively moving each of said friction pads between a first position engaging and applying the frictional drag force on the respective drive gear and a second position disengaged and spaced from the respective drive gear for said drive means to rotate said rotors without the frictional drag forces, said control means including a support bracket movably mounted in said gear housing between an intermediate position with each of said first and second friction pads in said second positions thereof, a lower position with said first friction pad in said first position thereof and said second friction pad in said second position thereof, and an upper position with said first friction pad in said second position thereof and said second friction pad in said first position thereof.

15. An air vehicle according to claim 14 wherein said first and second drive gears and said first and second rotors are fixedly coupled for simultaneous rotation by first and second rotor drive shafts, respectively;

angular control means is coupled to said drive shafts for tilting said drive shafts relative to a vertical axis.

16. An air vehicle according to claim 14 wherein a power gear, extending between said first and second drive gears, is coupled to said first and second drive gears on facing sides thereof; and said friction surfaces are located on sides of said first and second drive gears opposite said power gear.

17. An air vehicle according to claim 14 wherein each of said friction surfaces is substantially planar.

18. An air vehicle, comprising:

first and second coaxially mounted, contrarotating rotors;

a first drive means for rotating said first rotor in a first rotational direction, said first drive means including a first rotatable drive gear with a first planar friction surface on a top side thereof;

a second drive means for rotating second rotor in a second rotational direction opposite to the first rotational direction, said second drive means including a second rotatable drive gear with a second planar friction surface on a bottom side thereof, said first and second drive gears being horizontally mounted for rotation about a common vertical axis;

a power gear extending between said first and second drive gears and coupled to said first and second drive gears on facing sides thereof;

a gear housing enclosing said first and second drive gears and said power gear;

first and second friction pads located adjacent to and releasably engagable with said friction surfaces of said first and second drive gears, respectively;

yaw control means for supporting said friction pads and for selectively moving each of said friction pads between a first position engaging and applying a frictional drag force on the respective drive gear and a second position disengaged and spaced from the respective drive gear, said control means having a support bracket including first and second parallel flanges extending from a common back member, said first and second friction pads being coupled to said first and second flanges, respectively, with said first and second flanges and said first and second friction pads overlying said friction surfaces;

control linkage means, coupled to said back member of said support bracket, for moving said support bracket to position said friction pads selectively in said first and second positions, said control linkage means including pivoted lever means coupled to said back member by a pair of control cables; and biasing means coupled to said support bracket for biasing said support bracket to a normal position in which said first and second friction pads are located in said second positions thereof.

19. An air vehicle according to claim 18 wherein said control means cause said friction pads to apply the frictional drag forces on said gears in opposition to rotation thereof to rotate said rotors; and said drive means rotate said rotors independently of positioning of said friction pads.

* * * * *